United States Patent [19]
Clippard, III

[11] 4,323,003
[45] Apr. 6, 1982

[54] FLUID CYLINDER WITH REPLACEABLE ROD SEAL AND GUIDE

[75] Inventor: William L. Clippard, III, Cincinnati, Ohio

[73] Assignee: Clippard Instrument Laboratory, Inc., Cincinnati, Ohio

[21] Appl. No.: 132,798

[22] Filed: Mar. 24, 1980

[51] Int. Cl.³ .................... F01B 31/00; F16J 15/18
[52] U.S. Cl. ................................. 92/87; 92/168; 277/112; 308/3.5; 308/4 R
[58] Field of Search ............... 92/168, 165 R, 166, 92/169, 87; 277/152, 112, 205; 308/3.5, 4 R, 4 C

[56] References Cited

U.S. PATENT DOCUMENTS

| | | | |
|---|---|---|---|
| 2,091,729 | 8/1937 | Countryman | 92/168 |
| 2,998,288 | 8/1961 | Newhouse | 92/168 |
| 3,559,540 | 2/1971 | Sheldon | 92/168 |
| 3,685,398 | 8/1972 | Little | 92/168 |
| 4,086,844 | 5/1978 | Homuth | 92/168 |

*Primary Examiner*—Paul E. Maslousky
*Attorney, Agent, or Firm*—Wood, Herron & Evans

[57] ABSTRACT

A fluid pressure operated cylinder having a removable cylinder head insert or "nose" that carries a replaceable piston rod pressure sealing means and a rod guide bearing. The bearing and seal are mounted around the piston rod bore, adjacent an axially inner end of the nose, and are protected from dirt by a wiping passage that extends to an axially outer end of the nose. The nose is removable from the head for replacement, without disassembly of the head from the cylinder body.

7 Claims, 1 Drawing Figure

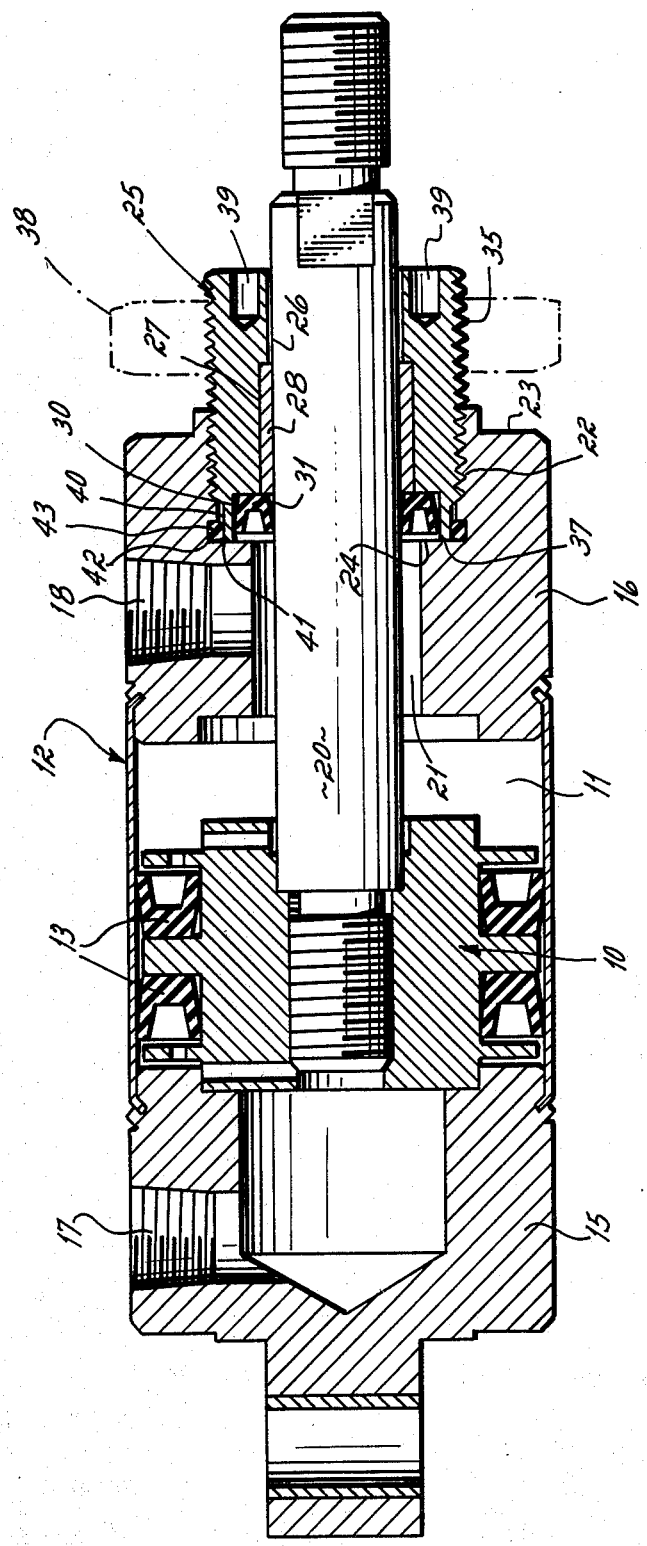

FLUID CYLINDER WITH REPLACEABLE ROD SEAL AND GUIDE

This invention relates to a fluid pressure operated cylinder having improved means for removing and replacing the piston rod pressure seal and/or the rod guide bearing.

It is known to provide a fluid cylinder actuator having a tubular metal body which is permanently secured at its opposite ends to separately formed head and tail elements. The cylinder head, through which the piston rod extends, is often made of a material such as aluminum which does not have good bearing or sealing characteristics. A rod guide bearing is thus usually mounted in an opening in the head through which the rod reciprocates. This bearing may be a sleeve bearing, for example of sintered bronze, other types of bearings and other bearing materials being used for different purposes. A pressure seal is also provided in the head, to prevent loss of pneumatic or hydraulic pressure fluid along a path between the rod and the head. The seal usually, although not always, is a "U" cup-type seal which is seated in the head and located axially inwardly of the bearing, so that the bearing acts as an outer wiper to remove dirt from the rod before it is carried into the seal.

In extended use, the seal and/or the bearing deteriorate and eventually fail under the reciprocation of the rod. Where the diameter of the piston rod is small in relation to the diameter of the piston itself, for example one-quarter or less, the rod seal and guide deteriorate far sooner than the seals on the piston, with the result that the piston seals may have good service life remaining when the rod seal or bearing is worn out.

In one previously known type of cylinder, having a head which is formed separately from the body and then permanently secured to the body, the axial bore for the rod in the head is counterbored or enlarged at its inner end, i.e., the end adjacent the piston chamber. The bearing and seal are installed in that counterbore prior to assembly of the head and the body. Neither the bearing nor the seal is accessible from the outside of the cylinder once the head has been secured to the body, and neither the seal nor the bearing can thereafter be removed or replaced. Thus extreme wear of either of those elements has generally required replacement of the entire cylinder, even through the piston, piston seals, and other elements remain effective.

This invention provides structure whereby either or both of the rod bearing or the seal can be simply and easily replaced so the lifetime of the unit is significantly extended, and which is at the same time less expensive to manufacture than the previous structure.

In accordance with this invention, there is provided a cylinder construction wherein the rod seal and bearing are mounted in a head insert or nose which is removably mounted in an oversize axial bore in the head. The nose is exteriorly accessible and is removable from the axial bore of the head through the outer end thereof. The nose in turn has an axial opening through it which mounts the guide bearing for the rod, the bearing being insertable into the nose from the inner end thereof when the nose is removed from the head. The nose also mounts a piston rod seal which is received in its axial opening in a position axially inward of the bearing also mounted therein. Like the bearing the seal is insertable in the nose before the latter is attached to the head.

Means are provided around the outside of the nose for providing a seal between the nose and the bore in the head in which the nose is secured. In the preferred form the nose projects axially outwardly from an end face of the head and the bearing extends at least in part to an axial position which is outwardly of the plane of the end face of the head. An axial opening in the nose includes a portion extending outwardly of the bearing seated therein, which acts to wipe off dirt carried along the rod toward the bearing.

The invention can best be further described by reference to the drawing, which is an axial section of a cylinder incorporating a preferred embodiment of the replaceable bearing and guide means of this invention.

The fluid cylinder illustrated in the drawing is of the pneumatic type and has a piston 10 which is movable in a fluid pressure chamber 11 defined within a cylinder body 12. Oppositely oriented piston seals 13, 13 are carried in grooves around the periphery of piston 10 and form seals with the inner surface of body 12.

A piston rod 20 projects axially from piston 10. Chamber 11 is closed at one end by a cylinder head 16 through which rod 20 passes, and at the opposite end by an end closure 15. In the embodiment shown cylinder body 12 is a metal tube which is secured, as by rolling or swaging, to the head and tail members 16 and 15 respectively. Operating pressure is admitted and then released from chamber 11 through pressure ports 17 and 18, in the tail and head elements respectively.

Head 16 has an axial bore 21 which includes an enlarged and threaded portion 22, extending inwardly from the outer end or face 23 of the head. A shoulder 24 is presented at the inner end of enlarged bore portion 22.

A generally cylindrical insert, nose, or seal and bearing mounting element, 25 is removably mounted as by exterior threads in the enlarged bore portion 22 of head 16, and projects outwardly beyond head end surface 23. Nose 25 has an axial opening 26 the diameter of which is slightly greater than (e.g., 0.007 inches greater than) that of rod 20. A rod guide bearing 28, shown in this embodiment as a sleeve bearing, is fitted into this enlarged bore portion 27 from the inner end, i.e., the left end in the figure, of nose 25, against a shoulder in bore 26. This sleeve bearing is sized to provide sliding bearing engagement with the rod 20.

Axially inwardly of bearing 28 the bore 26 of nose 25 is further enlarged, as at 30, as a groove or recess. This bore portion 30 receives and mounts a piston rod sealing means which in the embodiment shown is in the form of a "U" cup-type seal 31. It is contemplated that other types of seals may be used for hydraulic sealing, high temperature conditions, or the like. Pressure fluid in chamber 11 acting on the right face of piston 10 exerts a force on the angulated sides of seal 31 which tend to press the sides into sealing engagement with the rod and insert to form a fluid pressure seal between them.

Nose 25 is threaded around its external periphery as at 35, and these threads interfit with internal threading around bore portion 22 of head 16. Externally of head 16, the threads 35 of the nose may also receive a nut 38, by which the cylinder may be mounted to a flange or panel. Two wrench sockets 39, 39 are formed in the endwise face of nose 25 for engagement by a cooperating wrench to turn the nose with respect to the head.

A second sealing element is provided between the nose insert and the head. For this purpose, the outer surface of nose 25 is reduced in diameter adjacent the inner end 37 thereof to provide a cylindrical surface 40 which leads to a chamfered edge 41. At this same axial position bore 22 in the head is relieved to form a recess or groove 42 in which is seated a nose seal 43, preferably in the form of a circular sectioned ring seal. As nose 25 is threaded into head 16, chamfered edge 41 expands the ring seal 43 to accommodate the cylindrical surface 40 of the nose. Seal 43 prevents loss of pressure between the outer surface of nose 25 and the head bore; whereas "U" cup-seal 31 prevents loss of pressure between piston rod 20 and nose bore 26.

Both bearing 28 and seal 31 are mounted or inserted in place from the inner end of nose 25, before the nose is threaded into the head. When with use the rod bearing 28 or the rod seal 31 deteriorates, these elements can readily and inexpensively be replaced. To do so, nose 25 is removed fom head 16 by unscrewing it and sliding it longitudinally off rod 20. Rod seal 31 and/or bearing 28, and/or outer seal 43 may be replaced while the nose is removed from the head. Most easily a new nose 25, with a new sleeve and seal premounted in it, can be slid along rod 20 and secured to the head to form the respective rod-to-nose and nose-to-head seals. It is desirable and preferred to apply an anerobic sealant (for example, such as that sold under the tradmark "Loc-Tite") to the threads 35 when inserting the nose, in order to prevent loosening of the insert under the endwise pressure which acts on it.

It should be noted that the narrow clearance between rod 20 and the nose bore 26, outwardly of bearing 28, serves as a wiper passage to clear away dirt particles on the rod and prevent them from ever contacting the sleeve 28. Fine particles which do reach the bearing are then prevented by the bearing from reaching the seal 31 inwardly of the bearing. A rod wiper may be mounted outwardly of bearing 28 in bore 26 for this purpose.

It should also be noted that the nose positions bearing 28 at least partially outwardly of the end face 23 of head 16. In effect this provides extra length at the head for better bearing service by reducing piston cocking. This construction reduces manufacturing cost in comparison to conventional one-piece head constructions because the nose can be made from smaller diameter stock than the head, and at a savings in material over a head which is sufficiently long to provide an equivalent axial position of the bearing in relation to the head.

Having described the invention, what is claimed is:

1. In a fluid cylinder wherein a piston is pressure operated within a chamber and seal and guide bearing means are provided to seal and guide the movement of a piston rod extending from the piston through an axial bore in a cylinder head at the end of the chamber, the improvement comprising, a nose removably mounted in the bore of said head, said nose having means for removing it from said bore through the outer end thereof while the head is mounted to the body, the nose having an axial opening in which is mounted a guide bearing for said rod, said bearing being mountable in said nose, when the nose is removed from the head, only from the inner end of the nose, said nose also mounting a rod seal which is received and mounted in said opening axially inward of the bearing, said nose projecting axially outwardly from an end face of the head, said bearing at least in part extending to an axial position which is outwardly of the end face of the head, and means providing a pressure seal between said nose and said cylinder head, wherein said nose has a cylindrical outer surface adjacent its inner end, and wherein said head presents a peripheral groove in said bore and a ring seal is seated in said groove, the outer surface of said nose engaging and forming a seal with said ring seal.

2. The improvement of claim 1 wherein the axial opening in the nose includes a portion outwardly of the bearing seated therein which acts to clear off dirt being carried on the rod toward the bearing.

3. The improvement of claim 2 wherein said nose is secured in an enlarged portion of the axial bore of the head, and bears against an endwise shoulder thereof.

4. The improvement of claim 3 wherein said nose is threaded in said bore.

5. The improvement of claim 4 wherein the nose provides removing means exteriorly of said bore for engaging the nose to remove the nose from the head.

6. The improvement of claim 1 wherein said guide bearing is a sleeve bearing.

7. The improvement of claim 1 wherein said seal is a "U" cup seal.

* * * * *